United States Patent
Hickman et al.

(10) Patent No.: US 7,204,289 B2
(45) Date of Patent: Apr. 17, 2007

(54) WELDING TIP

(75) Inventors: Johnny M. Hickman, Ashley, IN (US); Mark A. Myers, Waterloo, IN (US); Dale W. Taylor, Hamilton Lake, IN (US)

(73) Assignee: Rieke Corporation, Auburn, IN (US)

( * ) Notice: Subject to any disclaimer, the term of this patent is extended or adjusted under 35 U.S.C. 154(b) by 158 days.

(21) Appl. No.: 10/698,337

(22) Filed: Oct. 31, 2003

(65) Prior Publication Data

US 2004/0149393 A1    Aug. 5, 2004

Related U.S. Application Data

(60) Provisional application No. 60/423,081, filed on Nov. 1, 2002.

(51) Int. Cl.
    *B32B 37/00*    (2006.01)
(52) U.S. Cl. .................... 156/581; 156/583.1
(58) Field of Classification Search ............ 156/73.1, 156/580.1, 580.2, 581, 580, 583.1; 264/442, 264/443, 445; 425/174.2; 228/110.1, 1.1
    See application file for complete search history.

(56) References Cited

U.S. PATENT DOCUMENTS

| | | |
|---|---|---|
| 1,281,454 A | 10/1918 | White |
| 2,231,480 A | 2/1941 | Pilger |
| 3,593,000 A | 7/1971 | Forma |
| 3,679,509 A | 7/1972 | Fielibert |
| 3,900,714 A | 8/1975 | Beyer |
| 3,947,307 A | 3/1976 | Buchscheidt |
| 4,063,990 A | 12/1977 | Volz et al. |
| 4,411,720 A | 10/1983 | Sager |
| 4,508,581 A | 4/1985 | Rohringer |
| 4,514,612 A | 4/1985 | Nied |
| 4,595,435 A | 6/1986 | Rohringer |
| 4,681,645 A * | 7/1987 | Fukushima et al. ........ 156/73.1 |
| 4,695,337 A | 9/1987 | Christine |
| 4,728,769 A | 3/1988 | Nishiwaki |
| 4,767,478 A | 8/1988 | Christine |
| 4,904,319 A * | 2/1990 | Divincenzo et al. ....... 156/73.4 |
| 4,913,307 A * | 4/1990 | Takata et al. ................ 220/276 |
| 5,110,040 A | 5/1992 | Kalberer et al. |
| 5,152,438 A | 10/1992 | Gordon et al. |
| 5,157,901 A * | 10/1992 | Okamoto et al. ............. 53/478 |
| 5,244,520 A | 9/1993 | Gordon et al. |
| 5,816,472 A | 10/1998 | Linn |
| 5,922,170 A | 7/1999 | Gerdes et al. |
| 6,396,195 B1 | 5/2002 | Lindblad et al. |
| 6,626,349 B2 * | 9/2003 | Janin et al. .................. 228/1.1 |
| 6,701,993 B2 * | 3/2004 | Faherty ..................... 156/581 |

FOREIGN PATENT DOCUMENTS

| | | |
|---|---|---|
| DE | 955172 | 4/1964 |
| EP | 0440291 | 8/1991 |
| EP | 0344340 | 12/1991 |
| FR | 1301091 | 8/1962 |
| JP | 07017568 | 1/1995 |

* cited by examiner

*Primary Examiner*—James Sells
(74) *Attorney, Agent, or Firm*—Woodard, Emhardt, Moriarty, McNett & Henry LLP

(57) ABSTRACT

The present invention is directed to a welding tip for welding polymeric materials such as containers. The welding tip includes a cylindrical body. The cylindrical body defines a central bore and includes a perimeter around the bore. The perimeter includes one or more knurls. The knurls provide the welding tip with varying temperatures and pressure points to create a more desirable weld.

15 Claims, 2 Drawing Sheets

WELDING TIP

CROSS-REFERENCE TO RELATED APPLICATIONS

This application is related to, and claims all benefits of U.S. Provisional Patent Application Ser. No. 60/423,081, filed on Nov. 1, 2002.

FIELD OF THE INVENTION

The present invention relates to a welding tip for the welding of plastic and plastic containers.

BACKGROUND OF THE INVENTION

Within the art of plastic containers for transporting liquids, solids, etc., such as plastic 55-gallon containers, vents typically must be installed in the container to assist in venting gases that can build up inside and cause failure of a cap or plug on the container or the container itself. Generally, caps or plugs are installed in the containers to help prevent such failure. The caps or plugs are drilled to provide a center aperture therethrough to provide communication between the container interior and the external environment. Such center apertures are covered by vents that permit gases, but not liquids, to be released from the container. Typically, vents are made of a polymeric material, such as polytetrafluoroethylene (PTFE) available under the trademark TEFLON from E.I. Du Pont Nemours and Company, which permit gases to escape through the cap, but not liquid.

Vents formed from polymeric material such as PTFE are difficult to weld to high or low density plastic caps or plugs. Particularly, welding the vent from such polymeric material may cause burning or cutting of the vent. It would be desirable to improve the welding of polymeric vents to plastic caps and/or plastic containers to avoid accidental burning or cutting of the vent materials.

SUMMARY OF THE INVENTION

The present invention is directed to a welding tip that improves the welding of a vent formed from a polymeric material such as PTFE onto plastic such as a plastic cap or plug. The improved welding tip utilizes a shape and structure that provides variable pressure and heat to the polymeric material vent. The variable heat and pressure provide a more controlled melt to the vent to prevent accidental burning or cutting. When the welding tip is applied onto the polymeric material vent placed over the cap or plug, the plastic cap or plug melts and penetrates into the vent to secure the vent to the cap or plug. It has been found that welding tip features such as pressure, temperature, and shape help produce a desirable weld between the polymeric material vent and the plastic cap. The welding tip welds the vent without burning or cutting the vent material.

In one aspect, the present invention is directed to a welding tip. The welding tip includes a cylindrical body. The cylindrical body has an opening at an end of the cylindrical body defined by a perimeter. The perimeter includes a plurality of knurls. In another aspect, the welding tip perimeter is tapered so that an inner portion of the perimeter extends outwardly further than an outer portion. In a further aspect, the knurls extend from an inner edge of the perimeter to an outer edge of the perimeter.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings that form a part hereof, and wherein.

DETAILED DESCRIPTION OF THE PREFERRED EMBODIMENTS

Figure 1:
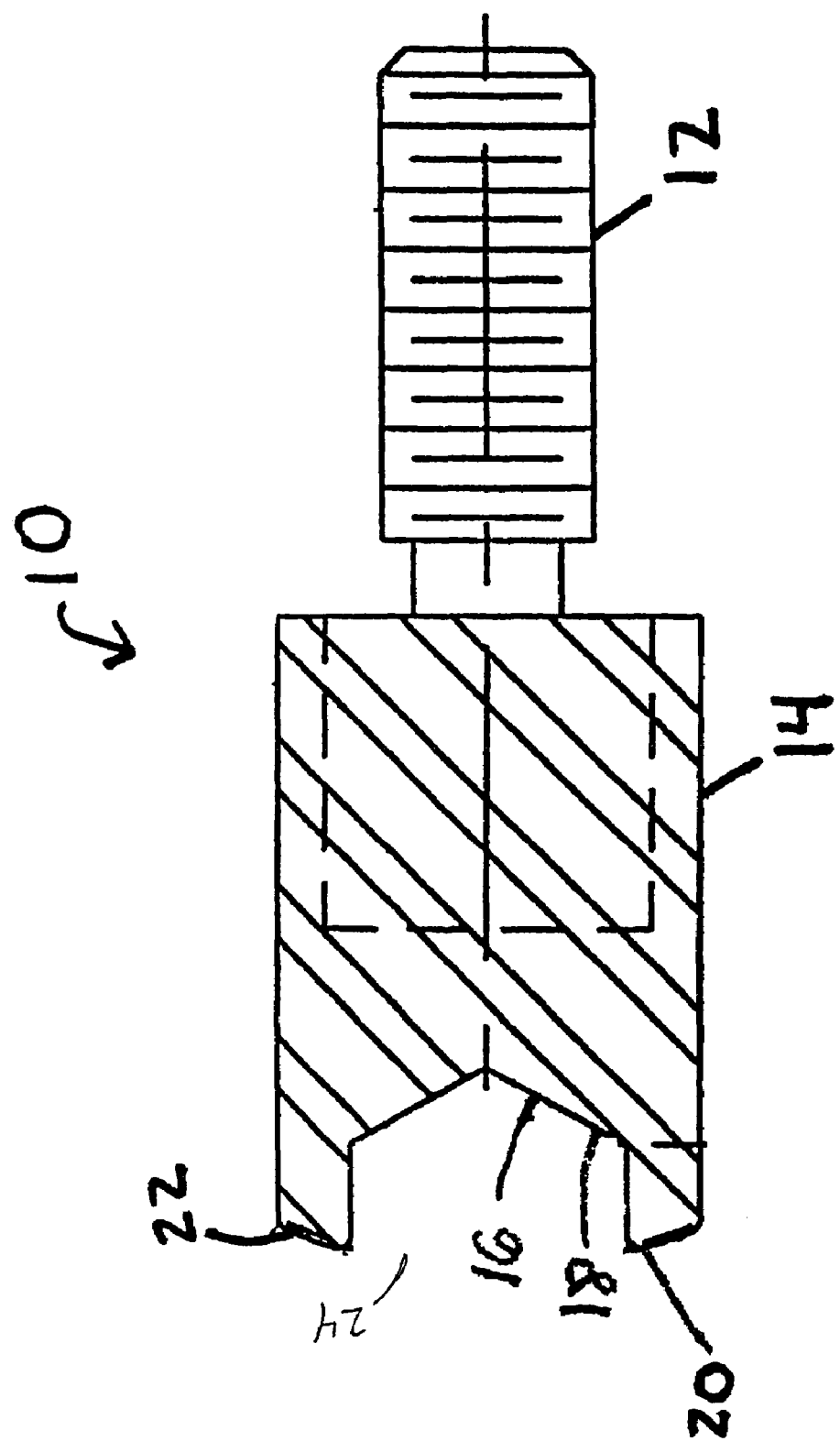
FIG. 1 shows a side view of a welding tip 10.

Referring now to the drawings wherein the drawings are for the purposes of illustrating the preferred embodiment of the invention only and not for purposes of limiting same, FIG. 1 shows a welding tip 10. The welding tip 10 includes a threaded bolt 12 that is attachable to a weld gun. The welding tip 10 also includes a body 14 connected to the threaded bolt 12. The body 14 is cylindrical-shaped although other geometric shapes are also contemplated. Also, the body 14 is metal although other materials are also contemplated. The body 14 defines a central bore 16 along its interior wall 18. The central bore 16 is conical-shaped although other geometric shapes are contemplated. A perimeter 20 is located at an end of the body 14. The perimeter 20 is ring-shaped and defines an opening 24 at the end of the body 14. The perimeter 20 is angled or tapered from its inner portion to its outer portion so that the inner portion of the perimeter 20 extends longitudinally outward further than the outer portion of the perimeter 20. The perimeter 20 includes one or more knurls 22. The knurls 22 allow the welding tip 10 to create varying high and low temperature and pressure points in the perimeter 20 that minimize the accidental burning or cutting of the polymeric vent during welding and, thus, provides a controlled melt.

Figure 2:
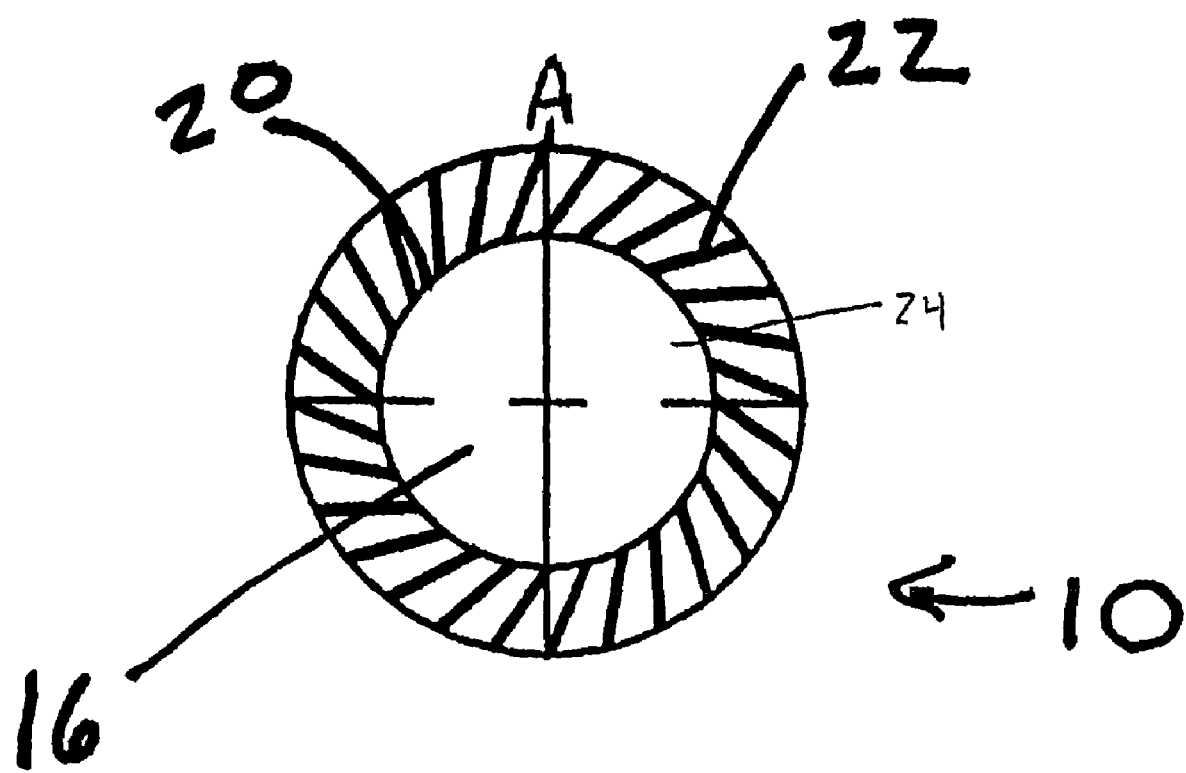
FIG. 2 shows a front view of a welding tip 10.

FIG. 2 shows a top view of the welding tip 10 including the central bore 16 and the perimeter 20 defining the opening 24. The perimeter 20 includes one or more knurls 22. The knurls 22 can be any type of groove, ridge, knot, knob, or protuberance. The knurls 22 reduce the amount of heat and pressure of the welding tip on the polymeric material. The knurls 22 extend radially from the inner edge of the perimeter 20 to the outer edge of the perimeter 20. Alternatively, the knurls 22 can extend at angularly in a non-radial direction. Also, it is contemplated that the knurls 22 may be curved instead of straight.

In operation, the welding tip 10 welds a vent formed from a polymeric material such as PTFE to a plastic cap or plug. The perimeter 20 provides an extended pressure and temperature contact point and creates a controlled melt that radiates outwardly from the inner portion to the outer portion of the perimeter 20 due to the knurls 22. The central bore 16 prevents the welding tip 10 from heating the interior portion where the vent is located, which can damage the vent. Thus, the plastic cap or plug is melted due to the perimeter 20 whereas the vent, which is adjacent to the central bore 16, does not. The melted portion of the plastic cap or plug penetrates into the vent to create the weld.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

The invention claimed is:

1. A welding tip comprising:
   a cylindrical body, said cylindrical body having an opening at a first end defined by a heatable perimeter having an inner edge and an outer edge;
   said perimeter including a plurality of knurls, wherein said knurls provide varying high and low temperature points in said perimeter, wherein said knurls extend outwardly from said inner edge to said outer edge and are configured to extend angularly in a non-radial direction.

2. The welding tip of claim 1, wherein said cylindrical body further defines a central bore extending from said opening into said cylindrical body.

3. The welding tip of claim 1, wherein said perimeter is tapered.

4. The welding tip of claim 1, wherein an inner portion of said perimeter extends outwardly further than an outer portion of said perimeter.

5. The welding tip of claim 2, wherein said central bore has a conical shape.

6. The welding tip of claim 1, wherein said cylindrical body further comprises a second end opposite said first end, said second end including a threaded bolt.

7. A welding tip comprising:
   a cylindrical body, said cylindrical body having an opening at a first end defined by a heatable tapered perimeter having an inner edge and an outer edge;
   said perimeter including a plurality of knurls, wherein said knurls provide varying high and low temperature points in the perimeter to provide a controlled melt weld, wherein said knurls extend outwardly from said inner edge to said outer edge and are configured to extend angularly in a non-radial direction.

8. The welding tip of claim 7, wherein said cylindrical body further defines a central bore extending from said opening into said cylindrical body.

9. The welding tip of claim 7, wherein an inner portion of said tapered perimeter extends outwardly further than an outer portion of said tapered perimeter.

10. The welding tip of claim 8, wherein said central bore has a conical shape.

11. The welding tip of claim 7, wherein said cylindrical body further comprises a second end opposite said first end, said second end including a threaded bolt.

12. A welding tip comprising:
    a cylindrical body, said cylindrical body having an opening at a first end defined by a heatable tapered perimeter, wherein an inner portion of said tapered perimeter extends outwardly further than an outer portion;
    said perimeter including a plurality of knurls, said knurls extending outwardly from an inner edge of said tapered perimeter adjacent to said opening to an outer edge of said perimeter and are configured to extend angularly in a non-radical direction, wherein said knurls create varying high and low temperature points in the perimeter to provide a controlled melt weld.

13. The welding tip of claim 12, wherein said cylindrical body further defines a central bore extending from said opening into said cylindrical body.

14. The welding tip of claim 13, wherein said central bore has a conical shape.

15. The welding tip of claim 12, wherein said cylindrical body further comprises a second end opposite said first end, said second end including a threaded bolt.

* * * * *